April 25, 1939.     W. A. DUFFIELD     2,156,041
VARIABLE SPEED TRANSMISSION
Filed July 16, 1937     3 Sheets-Sheet 1

INVENTOR
William A. Duffield
BY
ATTORNEY

April 25, 1939.  W. A. DUFFIELD  2,156,041
VARIABLE SPEED TRANSMISSION
Filed July 16, 1937   3 Sheets-Sheet 2

INVENTOR
William A. Duffield
BY
Harry a. Madden
ATTORNEY

Patented Apr. 25, 1939

2,156,041

UNITED STATES PATENT OFFICE 2,156,041

VARIABLE SPEED TRANSMISSION

William A. Duffield, Windsor, Ontario, Canada, assignor to Modern Equipment Limited, Montreal, Quebec, Canada, a duly incorporated company Application July 16, 1937, Serial No. 153,874

10 Claims. (Cl. 74—189.5)

This invention relates to a variable speed transmission of power from a prime mover to the operating shaft in automobiles and the like.

The object is to provide a transmission including a fluid coupling of the Fottinger type, having three forward speeds in which the change takes place automatically, and one reverse drive.

A further object is to provide a reverse drive through the mechanism of the forward drive.

A further object is to provide a mechanical clutch which at a predetermined speed couples the fluid coupling to the planetary gear.

A further object is to provide a transmission in which the fluid coupling has a double function. First as a primary coupling from the power shaft to the main shaft, and second to complete the adjustment of the transmission for direct drive.

Further objects will be set forth hereinafter.

Reference is made to the accompanying drawings in which.

Figure 1:
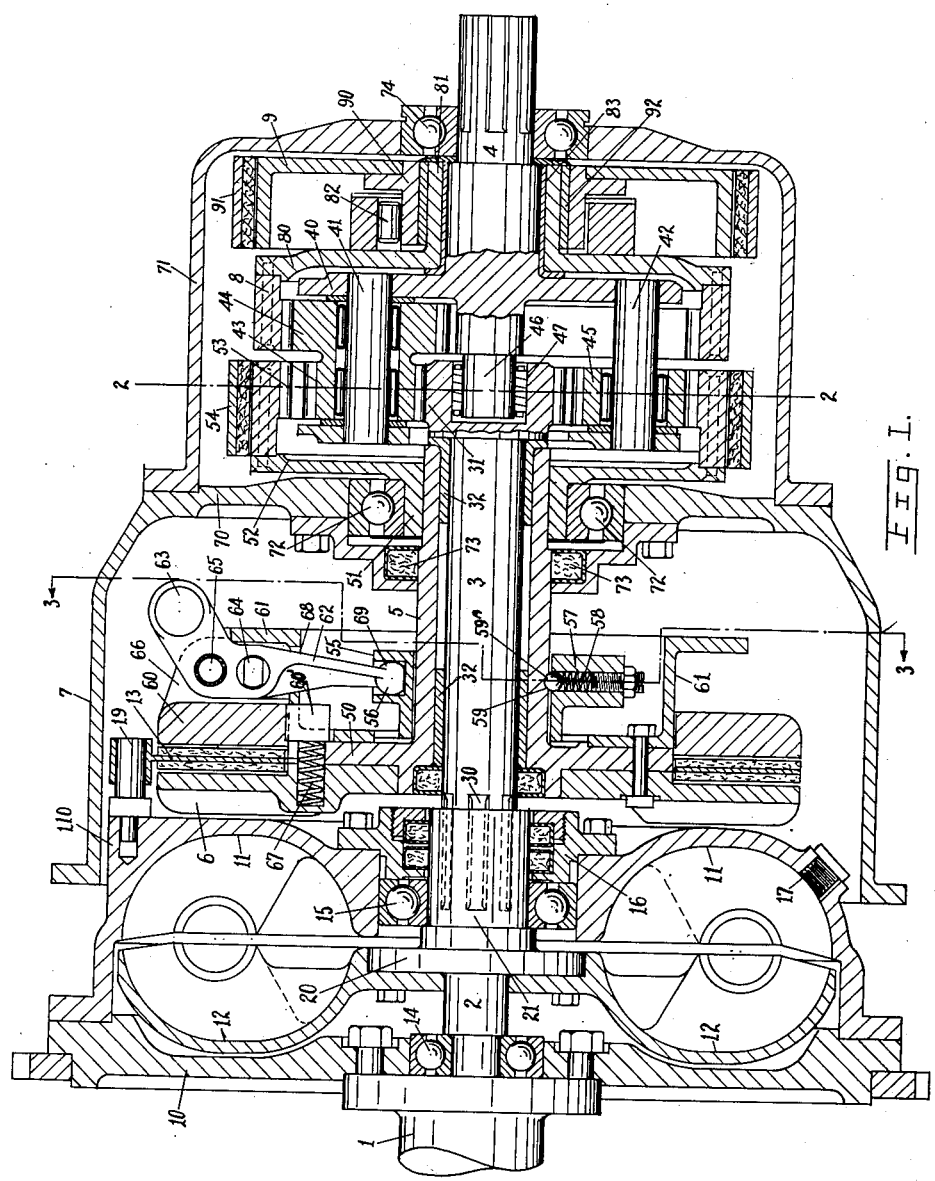
Figure 1 is a vertical section through the axes of the shafts and partly on the lines 1—1 of Figures 2 and 3.
Figure 2:
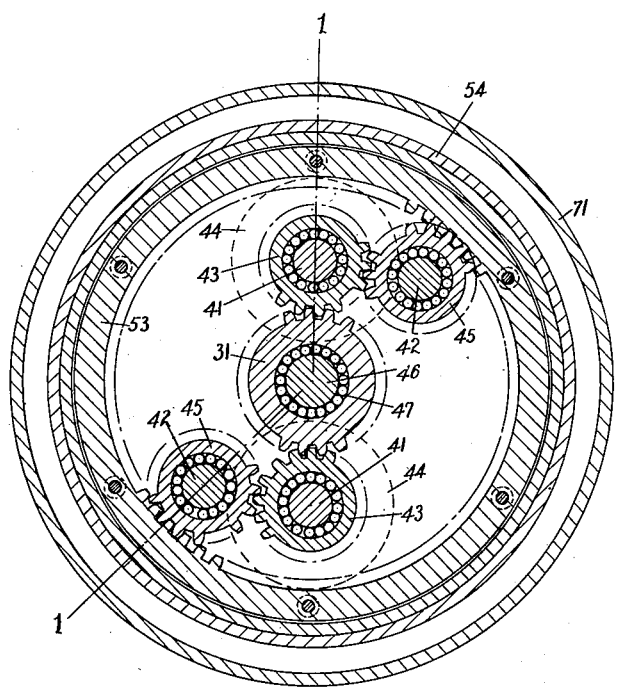
Figure 2 is a vertical cross section on the line 2—2 of Figure 1.

As shown in Figure 1, the transmission comprises three main elements which are readily separated. These are a fluid coupling of the Fottinger type, a planetary gear element and an intermediate clutch element.

Figure 3:
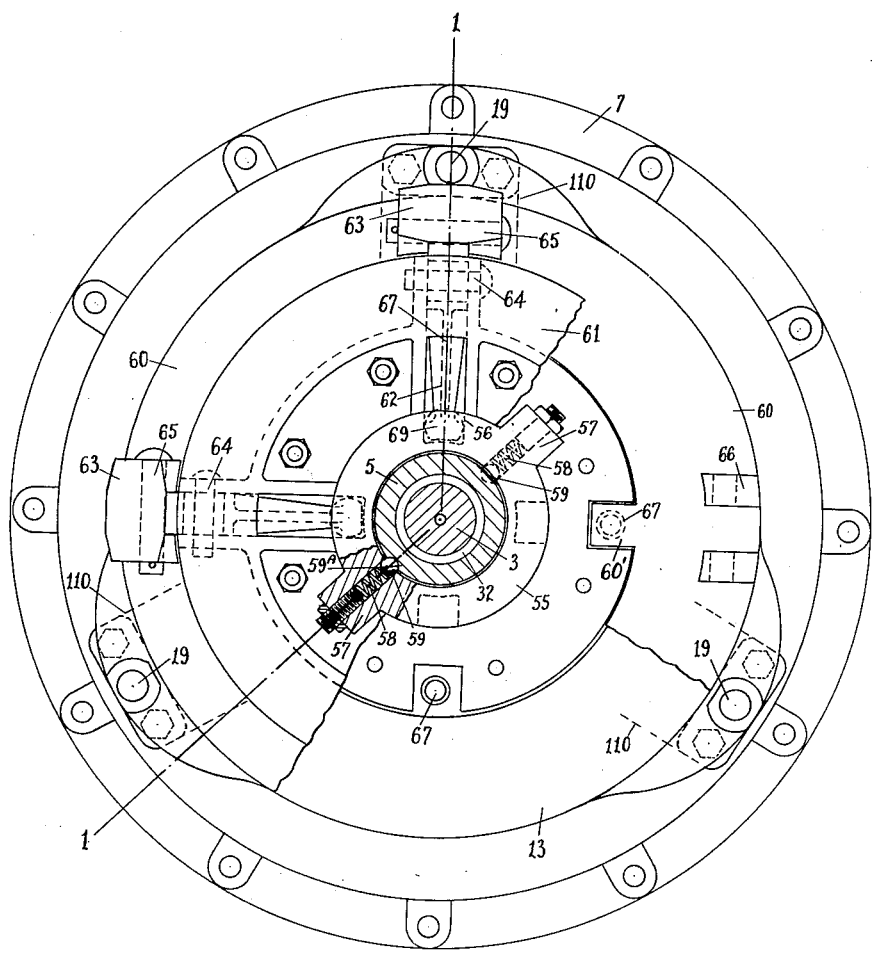
Figure 3 is a vertical cross section on the line 3—3 of Figure 1 having portions cut away.

The fluid coupling element comprises a power shaft 1 to which is bolted a fly wheel 10. The driver member 11 of the fluid coupling has a peripheral flange which is bolted to the fly wheel 10. A short shaft 2 is journalled at one end in a bearing 14, in the fly wheel 10 and within the driver member 11 in bearing 15, towards the other end, which has a splined bore 21. A packing box 16 bolted to the driver member 11 encloses the end of the shaft 2. A removable plug 17 in the driver member 11 permits the filling and emptying of the coupling. The runner member 12 is bolted to the flange 20 of the shaft 2. The planetary gear element comprises a shaft 3 splined at one end 30 to fit the bore 21 of the shaft 2 and having a pinion 31 at the other end. A tail shaft 4 having one end 46 journalled in a pilot bearing 47 within the pinion 31 of the shaft 3 and in bearing 74 in the end of the gear casing 71. The shaft 4 has a flange 40 which provides a carrier for the planetary gear. The carrier 40 has two sets of pins, 41—41 on which are journalled gears 43 meshing with the pinion 31 of the shaft 3, and 42—42 on which are journalled gears 45 meshing with the gears 43. The pins 41 also carry gears 44 which are integral with the gears 43. Journaled on shaft 4 beyond the carrier 40 on bearing 83 is a sleeve 81 with a flange disc 80 having an annulus 8 which meshes with the gears 44. Bolted to the disc 80 is an overrunning clutch 82 which bears on a flanged sleeve 90 journalled on bearing 92 on the sleeve 81. The flange of the sleeve 90 is bolted to a brake drum 9 having a brake band 91 to control it. Journalled on bearing 32 on the shaft 3 is a sleeve 5 on the end of which is keyed the sleeve 51 which is journalled in the large bearing 72 mounted in the end wall 70 of the frame 7. By this means the shaft 3 is provided with rigid bearings adjacent its pinion 31. The sleeve 51 has a disc 52 which carries an annulus 53 which meshes with the gears 45 and is provided with a brake band 54. Adjacent the bearing 72 on the sleeve 5 is an oil retainer 73 secured to the end wall 70. The gear casing 71 is bolted to the end wall 70 of the frame 7. Between the fluid coupling element and the planetary gear element is a clutch element. As shown in Figures 1 and 3 this takes the form of a centrifugal clutch. The sleeve 5 has a flange 50 which is bolted to the back plate 6 of a disc clutch. The disc 13 is mounted to slide on a set of pins 19 secured to bosses 110 on the driver member 11 at its periphery. The flange 50 also has bolted to it the bracket ring 61 on which the presser plate 60 slides. The bracket ring 61 has a series of slots 68 in which splines 60' of the presser plate 60 slide. Release springs 67 set in the back plate 6 bear on these splines 60' and normally hold the clutch open. Levers 62 carrying weights 63 bear on fulcrum pins 64 on the bracket ring 61, and are journalled on roller bearings on pins 65 secured in brackets 66 of the presser plate 60. The fulcrum pins 64 permit a slight movement of the levers 62. The levers 62 extend to ball ends 69. A control ring 55 slidingly mounted on the sleeve 5 has a series of cups 56 and opposing bosses 57. The ball ends 69 of the levers 62 enter the cups 56. In the bosses 57 are adjustable springs 58 bearing on balls 59 which are normally seated in recesses 59A in the sleeve 5.

The operation of the transmission is as follows:

For forward drive the band 91 is closed and holds the annulus 8 from reverse rotation. When the power shaft 1 starts, it rotates the fly wheel 10 and driver member 11. As it speeds up the driver member 11 gradually couples with the runner member 12 and the drive is then through shafts 2 and 3, pinion 31, gears 43 and 44, but as the annulus 8 is fixed, the carrier 40 is rotated and with it the tail shaft. As this is taking place the gear 43 is rotating in a reverse direction and gear 45, meshing with gear 43, is driving the annulus 53 forward. This drive rotates the open clutch 6—60 and levers 62. When the speed of rotation produces centrifugal force on the lever weights sufficient to dislodge the balls 59 of the control ring 55 the levers 62 rotating on their pivots 64, move the presser plate 60 and it then closes the disc clutch. This couples the power shaft 1 to the annulus 53 and rotates it at drive speed. If the annulus 53 is rotating at drive speed, the gears 45 will rotate at greater speed and through gears 43 and pinion 31 rotate the shafts 3 and 2 and runner 12 at greater than drive speed. This is clear as the carrier 40 and tail shaft 4 will not have reached drive speed.

When the runner is rotated at greater speed than the driver, the circulation of the fluid in the working circuit of the fluid coupling slows down and opens the coupling. This allows the runner to over-run the driver and produces second speed of the drive. This drive is through the drive shaft, the flywheel, driver member, centrifugal clutch, annulus 53, gear 45, carrier 40, to tail shaft 4. The runner and shafts 2 and 3 at this stage do not carry the drive. When the accelerator speeds up the drive shaft to exceed that of the runner, the fluid circulation again closes the coupling and runner and driver rotate together. But if the annulus 53 and pinion 31 rotate at the same speed the gears between them will cease to function and be cut out and the drive will become direct or high speed. The annulus 8 and over-running clutch will then over-run the brake drum sleeve 90. In slowing down the reverse steps are carried out. The weights permit the levers to return to their normal position and the springs 67 open the disc clutch.

The drive in reverse is obtained by releasing the band 91 of the brake drum 9 and holding the annulus 53 by the band 54. The drive is then from shaft 1, flywheel 10, driver 11, runner 12, shafts 2 and 3 pinion 31, gears 43—45 to the stationary annulus 53 causing the gear 45 to travel round the annulus 53 and rotate the carrier and tail shaft in the reverse direction. A feature of this reverse drive is that it is completely within the mechanism of the forward drive and has no special parts outside that drive. The fluid coupling has two distinct functions, its ordinary function of coupling the drive shaft to the transmission mechanism and its function of adjusting, when the mechanical clutch is closed, the drive speed with main shaft speed to produce first the second speed drive, and then on increasing the drive speed a direct drive. Various forms of mechanical clutches may be substituted for the one shown and described.

What I claim is:

1. In an automatic variable speed transmission a power driven shaft, a fly wheel bolted to a flange on the shaft, a fluid coupling of the Fottinger type having its driver member bolted to the fly wheel, a stub shaft journalled in bearings in the fly wheel and in the driver member, the runner member of the fluid coupling bolted to a flange of the stub shaft, a splined axial bore in the end of the stub shaft, a frame, a gear casing bolted to the frame, a transmission shaft having a pinion splined to the stub shaft and journalled in bearings in the frame end wall, a tail shaft journalled in a pilot bearing in the transmission shaft and in bearings in the gear casing and having a flange forming a carrier, planetary gears journalled on pins in the carrier, one set meshing with the pinion and a brake controlled annulus, providing a reduction gear drive, the other set meshing with an annulus on the disc of a sleeve journalled on the transmission shaft, an automatic clutch between this sleeve and the driver member of the fluid coupling comprising a disc on the driver member, a back plate bolted to a flange on the sleeve, a presser plate operated by weighted levers, an adjustable control for the levers, and springs in the back plate adapted to release the presser plate.

2. An automatic variable speed transmission having three separable elements, comprising a fluid coupling including a power shaft, a fly wheel, driver and runner members of the fluid coupling and a stub shaft, a planetary gear element including a transmission shaft with a pinion, a tail shaft integral with a carrier, two sets of planetary gears, a gear common to both sets meshing with the pinion, an annulus meshing with one set connected to a brake drum through an overrunning clutch and a second annulus meshing with the other set connected to a mechanical clutch, said clutch including means to couple the fluid coupling driver to the second annulus.

3. In an automatic variable speed transmission, a power shaft, a fly wheel, a fluid coupling of the Fottinger type, having driver and runner members, a stub shaft journalled in bearings in the fly wheel and in the driver member, a main shaft splined to the stub shaft and having a pinion, and journalled in bearings in the frame, a gear casing bolted to the frame, a tail shaft journalled in pilot bearings in the main shaft and in the gear casing, a carrier integral with the tail shaft, planetary gears journalled in the carrier, comprising two sets, one set meshing with the pinion, and an annulus controlled through an overrunning clutch by a brake drum and band, the other set compounded with the first set and meshing through it with the pinion, and an annulus on the flange of a sleeve journalled on the main shaft and a centrifugally operated mechanical clutch adapted to couple the said sleeve to the driver member of the fluid coupling at a predetermined speed.

4. In an automatic variable speed transmission, a power shaft, a fly wheel, a fluid coupling of the Fottinger type, having driver and runner members, a stub shaft journalled in bearings in the fly wheel and in the driver member, a frame, a main shaft splined to the stub shaft and having a pinion, and journalled in bearings in the frame, a gear casing bolted to the frame, a tail shaft journalled in pilot bearings in the main shaft and in the gear casing, a carrier integral with the tail shaft, planetary gears journalled in the carrier, comprising two sets, one set meshing with the pinion, and an annulus controlled through an overrunning clutch by a brake drum and band, the other set compounded with the first set and meshing through it with the pinion, and an annulus on the flange of a sleeve journalled on the main shaft and a centrifugal clutch adapted to couple the said sleeve to the driver member of the fluid coupling at a predetermined speed.

5. In an automatic variable speed transmission, a power shaft, a fly wheel, a fluid coupling of the Fottinger type, a main shaft having a pinion, a tail shaft having a flanged carrier, planetary gears comprising two sets, one set of gears meshing with the pinion, and an annulus controlled through an overrunning clutch by a brake drum and band, the other set compounded with the first set and meshing through it with the pinion, and a second annulus controlled by a brake band and means to couple this annulus with the power shaft.

6. In an automatic variable speed transmission, a main shaft coupled to a drive shaft by a fluid coupling of the Fottinger type, a tail shaft, a carrier integral with the tail shaft, planetary gears in two sets, mounted on the carrier and geared to the main shaft, an annulus controlled by a brake drum and band journalled on the tail shaft and meshing with one set, the other set compounded and meshing with a second annulus journalled about the main shaft having a brake band.

7. In an automatic variable speed transmission as claimed in claim 4, the combinaotion of three separable elements adapted to provide a low speed drive, a second speed drive and a high speed drive as well as a reverse drive.

8. In an automatic variable speed transmission as claimed in claim 5 means to provide a reverse drive, obtained by releasing the brake drum of the first annulus and holding the brake drum of the second annulus.

9. In an automatic variable speed transmission as claimed in claim 1, the mechanism adapted to provide a low speed drive including the fluid coupling, a second speed drive including both the fluid coupling and the centrifugal clutch, and a direct drive from the power shaft to the tail shaft.

10. In an automatic variable speed transmission a drive shaft, a flywheel, a fluid clutch of the Fottinger type having driver and runner members, the driver member secured to the flywheel, a main shaft having a pinion, and secured to the runner member, a tail shaft coaxial with the main shaft, a planetary gear carrier integral with the tail shaft, planetary gears in two sets mounted on the carrier and geared to the main shaft, an annulus controlled by a brake drum and band journalled on the tail shaft and meshing with one set, the other set compounded with the first set and meshing through it with a second annulus journalled about the main shaft, said second annulus having a brake band, and a centrifugal clutch adapted to connect the said second annulus with the flywheel.

WILLIAM A. DUFFIELD.